(12) United States Patent
Macik et al.

(10) Patent No.: US 9,111,025 B2
(45) Date of Patent: Aug. 18, 2015

(54) PROVIDING AUTOMATED PERFORMANCE TEST EXECUTION

(75) Inventors: Pavel Macik, Brno (CZ); Jiri Sedlacek, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 725 days.

(21) Appl. No.: 13/403,320

(22) Filed: Feb. 23, 2012

(65) Prior Publication Data

US 2013/0226520 A1    Aug. 29, 2013

(51) Int. Cl.
*G06F 11/34* (2006.01)
(52) U.S. Cl.
CPC ........ *G06F 11/3419* (2013.01); *G06F 11/3452* (2013.01)
(58) Field of Classification Search
CPC ............ G06F 11/3419; G06F 11/3409; G06F 11/3423; G06F 11/3452; G06F 11/34
USPC ............. 702/182, 81, 84, 108, 123, 183, 186; 703/22; 709/223–224; 714/47.1–47.2; 717/124, 127
See application file for complete search history.

(56) References Cited

U.S. PATENT DOCUMENTS

2009/0043540 A1*  2/2009  Faraj ............................ 702/186

OTHER PUBLICATIONS

Mahajan et al., Evaluation of Methods Used to Detect Warm-Up Period in Steady State Simulation, Proceedings of the 2004 Winter Simulation Conference, School of Industrial Engineering and Management, Oklahoma State University, 9 pp.*

* cited by examiner

*Primary Examiner* — Toan Le
(74) *Attorney, Agent, or Firm* — Lowenstein Sandler LLP

(57) ABSTRACT

A mechanism for automated performance test execution is disclosed. A method includes generating, by a computing device at periodic intervals, actual values of a performance test of a tested system. The method also includes computing a current value based on the generated actual values and computing a difference between the current value and another current value associated with a prior time. The another current value associated with the prior time is computed based on the generated actual values of the performance test at the prior time. When the computed difference is greater than a predetermined threshold, the method further includes detecting a beginning of a warm-up period of the tested system.

20 Claims, 5 Drawing Sheets

PROVIDING AUTOMATED PERFORMANCE TEST EXECUTION

TECHNICAL FIELD

The embodiments of the invention relate generally to a computer system and, more specifically, relate to mechanism for automated performance test execution.

BACKGROUND

Performance testing systems in connection with computer software for performance evaluation and optimization are well known in the art. It is a common practice to test speed, durability and reliability of the tested software system. With respect to reliability, it is important for results of a performance test that is executed multiple times against a particular system configuration to be identical or nearly the same. However, in a real-world environment, the performance test results may vary from each other due to several reasons, such as network latencies, process management operation systems, I/O operations, run-time optimization, and many others.

A well-known performance test is performance test iteration (PTI). PTI is a defined set of operations executed multiple times during run-time that generate maximal throughput (iterations per second) measured during the performance test. Generally, systems such as Java Virtual Machine (JVM) have a run-time optimization feature where frequently executed code is optimized and compiled into native code, which causes the particular code to be executed faster. This optimization is performed on-demand at run-time. When the PTI is repeatedly executed, the additional run-time optimization is also performed until all of the optimization is done. This optimization period is commonly known as a warm-up period.

One of the problems with performance testing is that the warm-up period varies from test case to test case, and from run to run, which makes it difficult to generally define the warm-up period for each of the different performance tests. Conventional solutions to such a problem include executing the PTIs until the system is warmed-up, and subsequently measuring the performance of the test results. A problem with such a solution is that it involves human intervention (as opposed to automation) to manually check when the system is warm-up period for each of the test cases. So a human checks the partial results (actual or current) during the beginning of the test execution to be able to determine and decide that the system is warmed up and further interacts with the system to pass on the "system is warmed up" information into the performance testing system. This approach is both time-consuming and prone to cause errors. Another conventional approach includes executing the PTI for many additional times beyond the optimization period for each of the different performance tests in order to confirm that the system is warmed-up, thus eliminating the effect of the warm-up period. In other words, in this approach, influence is statically insignificant to the measured average value of the actual/current values. For example, if the test is executed for whole week and the actual/current values are collected every second, this would result in over 600,000 values. If the warm-up period is a minute or so (~60 values) it is has a very low impact on the average results. However, with this automated approach, the test has to run for much longer time period to be sure the results are not affected by the warming up. Thus, this approach consumes both CPU load and time in order to execute the whole performance test:

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding of the various embodiments of the invention.

DETAILED DESCRIPTION

Figure 1:
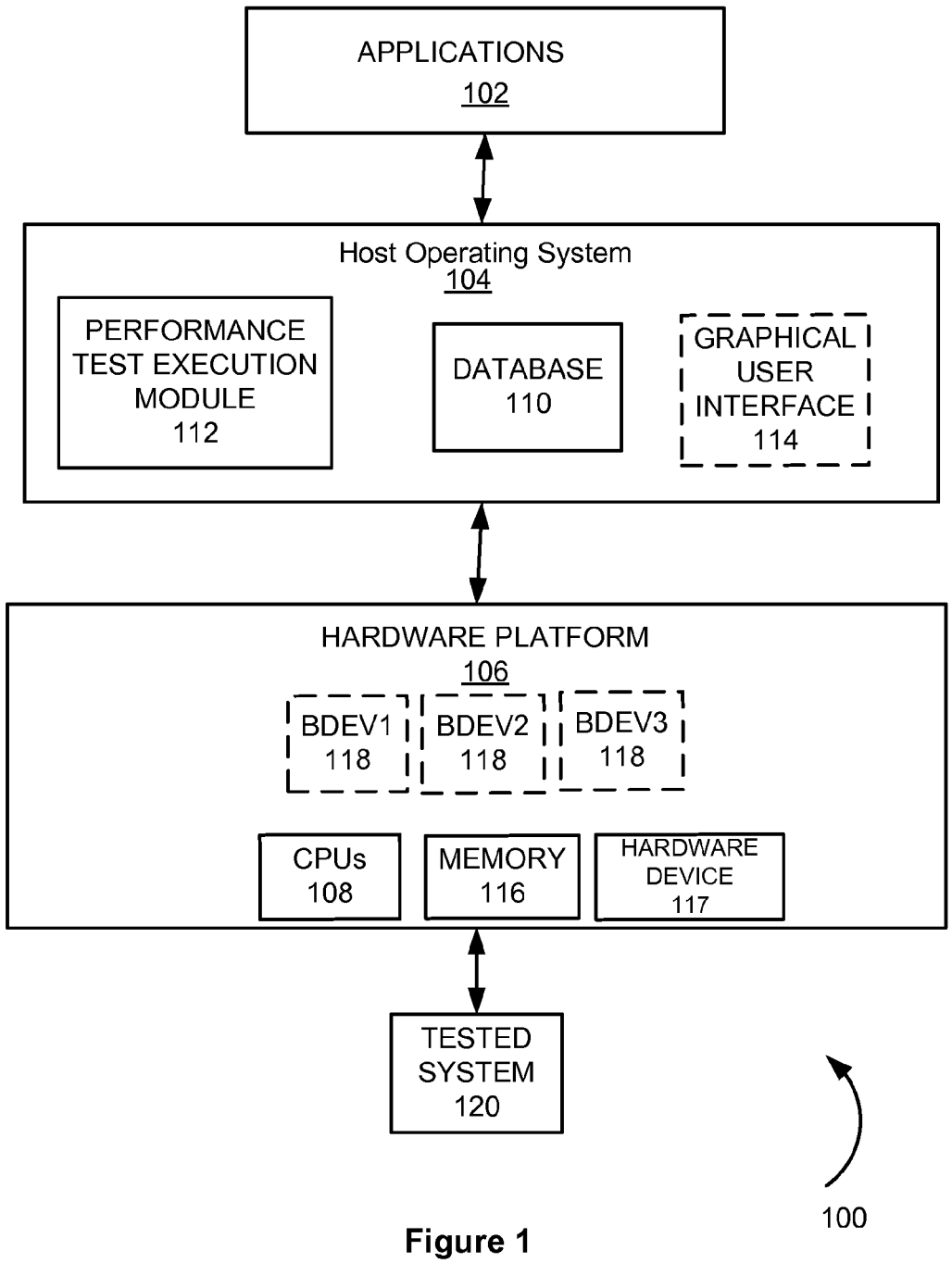
FIG. 1 is a block diagram of a computer system in which embodiments of the present invention may operate.

Embodiments of the invention provide a mechanism for automated performance test execution on a tested system. A method of embodiments of the invention includes generating, by a computing device at periodic intervals, actual values of a performance test of a tested system; computing a current value based on the generated actual values; computing a difference between the current value and another current value associated with a prior time, wherein the another current value associated with the prior time is computed based on the generated actual values of the performance test at the prior time; and when the computed difference is greater than a pre-determined threshold, detecting a beginning of a warm-up period of the tested system.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not typically, these quantities take the form of electrical or magnetic signals capable of being stored, transferred, combined, compared, and otherwise manipulated. It has proven convenient at times, typically for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "computing", "generating" detecting", "comparing", "storing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be constructed for the specific purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct an apparatus to perform the method steps. The structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Embodiments of the invention provide systems and methods for automated performance test execution. In one embodiment, a performance test execution module is initialized on a host operation system. The performance test execution module periodically generates actual values of a performance test of a test system connected to a computer system and computes current values based on the actual values. The performance test execution module functions to compute a difference between each of the current values associated with a present time (i.e., present current value) and the each of the current values associated with a prior time (i.e., prior current value). In one embodiment, the performance test execution module computes an absolute difference between each of the present current values and each of the prior current values.

In another embodiment, the performance test execution module computes a relative difference between each of the present current values with each of the prior current values. In one embodiment, when the computed relative difference is greater than a pre-determined threshold, the performance test execution module detects a beginning of a warm-up period of the tested system. On the other hand, when the computed relative different is less than the pre-determined threshold, the performance test execution module reiterates the execution of the performance test of the tested system.

FIG. 1 is a block diagram illustrating a computer system 100 in which embodiments of the present invention may be implemented. In one embodiment, the computer system 100 may be a host machine such as, for example, a server computer, a gateway computer or any other suitable computer system that is configurable for operating as a host. The computer system 100 comprises a hardware platform 106, on top of which runs a host OS 104 that executes one or more software application programs 102 (i.e., applications 102). The host OS 104 may include Microsoft Windows™, Linux™, Solaris™, Mac™ OS or any other suitable operating system for managing operations on the computer system 100. In one embodiment, the applications 102 executed by host OS 104 comprise multiple JAVA applications. In some embodiments, the multiple JAVA applications may be separate individual JAVA applications or multiple versions of the same JAVA application, or a combination of both.

The hardware platform 106 may include one or more central processing units (CPUs) 108 and memory 116. In one embodiment, the memory 116 comprises one or more hardware and software devices, which may be located internally and externally to the computer system 100. Examples of memory 116 may include, but are not limited to, random-access memory (RAM), non-volatile storage memory (e.g., Flash, EEPROM, solid state drives (SSD), etc.), magnetic storage memory (e.g., one or more hard drives), and optical memory (e.g., CDs, DVD, BlueRay drives, etc.). In addition, hardware platform 106 may include additional hardware devices 117, such as network interface cards (NICs), sound or video adaptors, photo/video cameras, printer devices, keyboards, displays or any other suitable device intended to be coupled to a computer system.

In some embodiments, the hardware platform 106 may also include one or more bus devices (BDEVs) 118. In one embodiment, the BDEVs 118 comprise one or more hardware and/or software devices, which may be located internally and/or externally to the computer system 100. Examples of the BDEVs 118 include, but are not limited to, universal bus devices (USB), general purpose interface bus (GPIB), local area network (LAN), or any other suitable device intended to couple to a computer system.

In one embodiment, one or more tested system(s) 120 may be communicably coupled to the host OS 104. Tested system 120 is a software system that is tested for its performance. In one embodiment, the tested system(s) 120 may be connected to the host OS 104 via a network (not shown). In another embodiment, the tested systems(s) 120 may be connected to the host OS 104 via a BDEV 118 (e.g. BDEV1) integrated with the computer system 100. In an embodiment, the BDEV 118 may be an integrated circuit (IC) separate from one or more CPUs 108. In another embodiment, the BDEV 118 may be integrated with the one or more CPUs 108.

The host OS 104 further includes a performance test execution module 112 to execute performance tests on the tested system(s) 120. In one embodiment, the performance test execution module 112 periodically generates actual values of the executed performance test of the test system 120 and computes current values based on the actual values. In one embodiment, the actual values are real values generated during execution of the performance test of the tested system. The current values are the values accumulated from the actual values and computed based on the actual values. As such, the actual values are the real values of the performance test and the current values are the computed values of the performance test. In another embodiment, the performance test execution module 112 stores both the actual values and the current values in database 110. In one embodiment, the performance test execution module 112 processes the current values to determine when the tested system(s) 120 is warmed-up. As discussed above, the warm-up period is the period during which all of the run-time optimization of the PTI is performed and upon completion of the optimization the system is known to be warmed-up. The host OS 104 may also include a graphical user interface (GUI) 114 configured to make the actual and current values available to a user for search or other actions.

Figure 2:
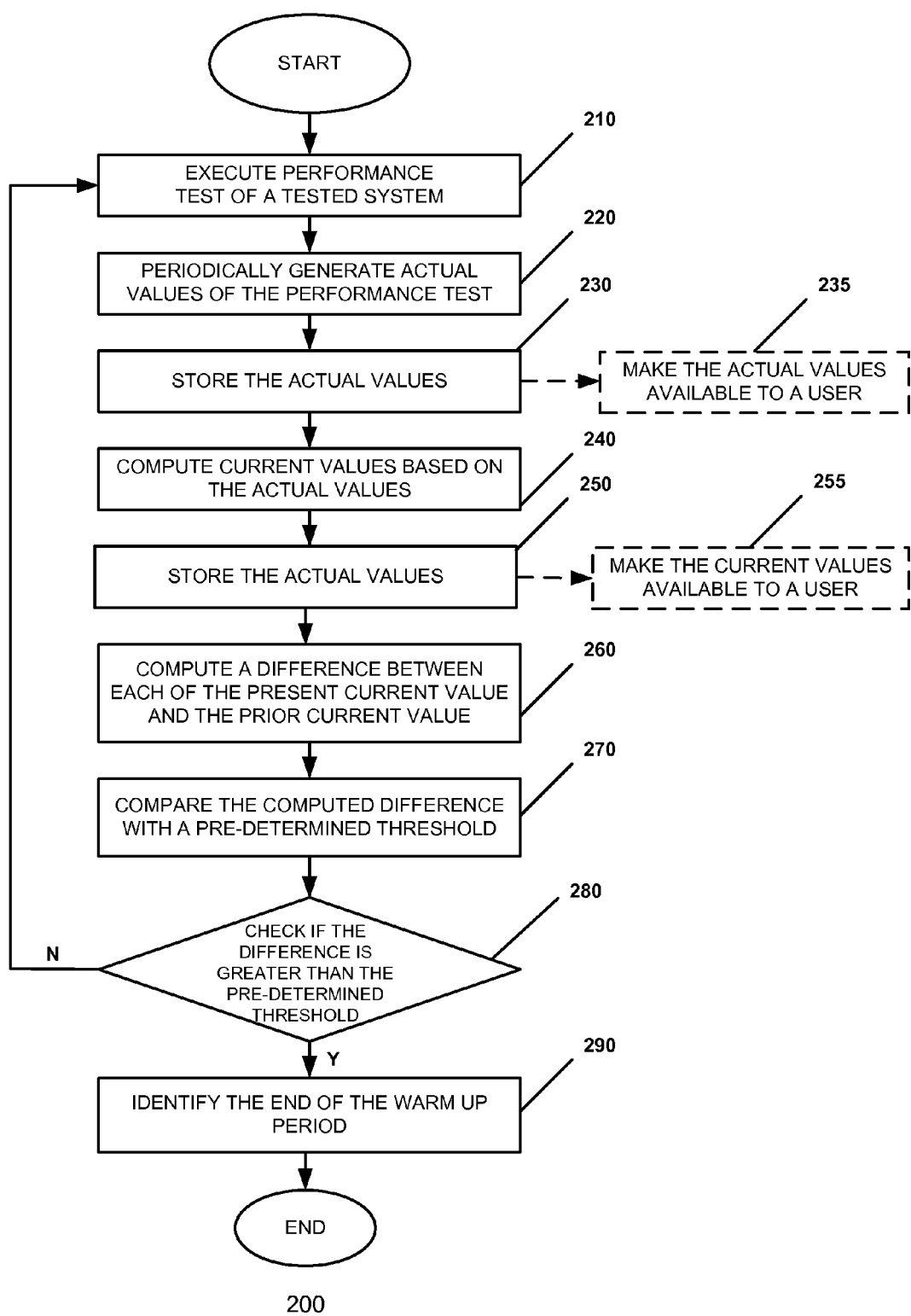
FIG. 2 is a flow diagram of one embodiment of a method for providing automated performance test execution.

FIG. 2 is a flow diagram illustrating a method 200 for providing automated performance test execution to a tested system according to an embodiment of the invention. Method 200 may be performed by processing logic that may comprise hardware (e.g., circuitry, dedicated logic, programmable logic, microcode, etc.), software (such as instructions run on a processing device), firmware, or a combination thereof. In one embodiment, method 200 is performed by performance test execution module 112 of FIG. 1.

Method 200 begins at block 210 where a performance test is executed on a tested system. In one embodiment, the performance test is a performance test iteration (PTI). As discussed above, PTI is a defined set of operations executed multiple times to generate maximal throughput (iterations per second) measured during the performance test. In another embodiment, the PTI is executed multiple times during runtime of a computer program in a tested system. Actual values of the performance test are generated periodically at block 220. The actual values are real values generated during execution of the performance test of the tested system. The actual values are stored in a database at block 230. In one embodiment, the actual values are stored in an ordered set that includes a time value and an actual value associated with the time value.

Figure 3A:
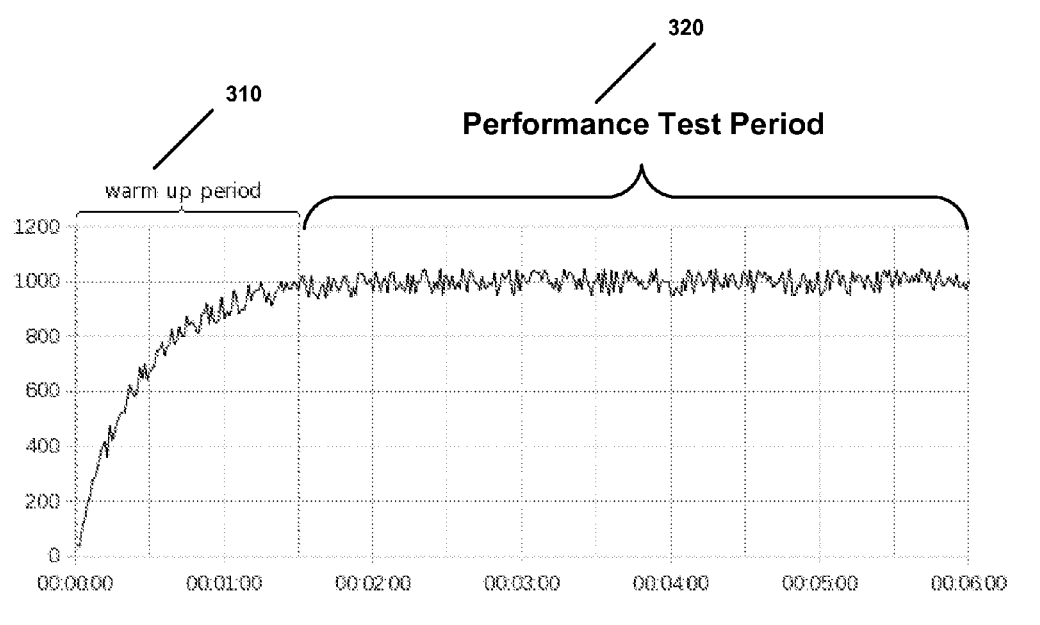
FIG. 3A illustrates a graphical representation of actual values of a performance test according to an embodiment of the present invention.

In one embodiment, an exemplary graphical representation of actual values, with corresponding times of a performance test, is illustrated in FIG. 3A. As shown in FIG. 3A, during the beginning of the performance test, the actual values are changing rapidly during a warm-up period 310. Then, after the warm-up period 310, the actual values are fairly constant, with little change, through the rest of the performance test period 320.

Referring back to FIG. 2, the actual values are made available to a user at block 235. In one embodiment, the actual values may be available via a GUI. The actual values are made available to the user in order to allow the user to perform actions on the performance test, such as searching, reporting, analyzing, and so on. At block 240, current values are computed based on the actual values. In one embodiment, the current values are computed as follows:

$$c_i = \frac{\sum_{j=0}^{i} x_j}{i}, i \leq w$$

where w is a window size, $x_j \ldots j^{th}$ is the actual value, $c_i$ is the current value at the index i, and is the index of the actual value in the ordered set. Furthermore, i is the total number of actual values generated and stored with the corresponding time values in the ordered set. In one embodiment, w is a pre-defined value and window is a subset of the ordered set. In one embodiment, when w is greater than or equal to i, then the current value, $c_i$, is determined as defined above.

In another embodiment, when w is less than i, then the current value $c_i$ is computed as follows.

$$c_i = \frac{\sum_{j=[i-w]}^{i} x_j}{w}, i > w$$

Figure 3B:
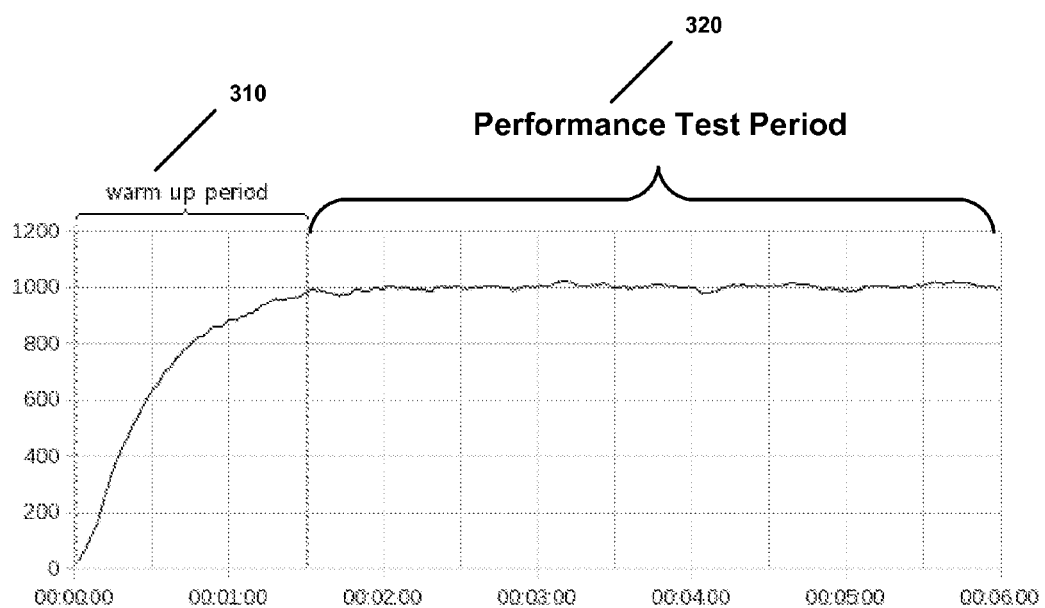
FIG. 3B illustrates a graphical representation of current values of a performance test according to an embodiment of the present invention.

Thus, the current values are the values accumulated from the actual values, and are the average of the actual values in one of i or w. In one embodiment, a graphical representation of the current values with corresponding times of the performance test 320 and warm-up period 310 is illustrated in FIG. 3B. As shown in FIG. 3B, the computed current values are considerably more uniform and consistent, as compared to the actual values of FIG. 3A.

Referring back to FIG. 2, the current values are stored in the database at block 250. In one embodiment, the current values are also stored in an ordered set that includes a time and a current value associated with the time. Then, at block 255, the current values are made available to a user. In one embodiment, the current values may be available via a GUI. The current values are made available to a user in order to allow the user to perform actions on the performance test, such as searching, reporting, analyzing, and so on.

Subsequently, at block 260, a difference is computed between each of the present current value and the prior current value. The present current value is defined as the value at a present time and the prior current value is defined as the value at the time immediately prior to the present time. In one embodiment, an absolute difference, $a_i$, between each of the present and the prior current values is computed as follows:

$$\text{absolute difference} \ldots a_i = |c_i - c_{i-1}|,$$

where $c_i$ is the present current value and $c_{i-1}$ is the prior current value at the second time.

In another embodiment, a relative difference $r_i$, between each of the current values is computed as follows:

$$\text{relative difference} \ldots r_i = \left| \frac{c_i}{c_{i-1}} - 1 \right|$$

Subsequently, at block 270, the computed difference (e.g., either absolute or relative) is compared with a pre-determined threshold. In one embodiment, the predetermined threshold is an absolute threshold value, determined prior to the test execution. If the predetermined threshold is an absolute threshold value, then the absolute difference, $a_i$, is compared with the absolute threshold value. In another embodiment, the predetermined threshold is a relative threshold value, determined before the test execution. If the predetermined threshold is a relative threshold value, then the relative difference, $r_i$, is compared with the relative threshold value.

At decision block 280, it is determined whether the difference (i.e., absolute or relative) is greater than the pre-determined threshold. If the determined difference is greater than the pre-determined threshold, then method 200 proceeds to block 290 where an end of the warm-up period of the tested system is identified. This end of the warm-up period determines the beginning of performance test execution. So, the end of the warm-up period determines when to start the post warm-up actions, such as actual performance measurements of the tested system. On the other hand, if it is determined that the computed difference (i.e., absolute or relative) is less than the pre-determined threshold at decision block 280, then method 200 returns to block 210 to repeat method 200.

Figure 4:
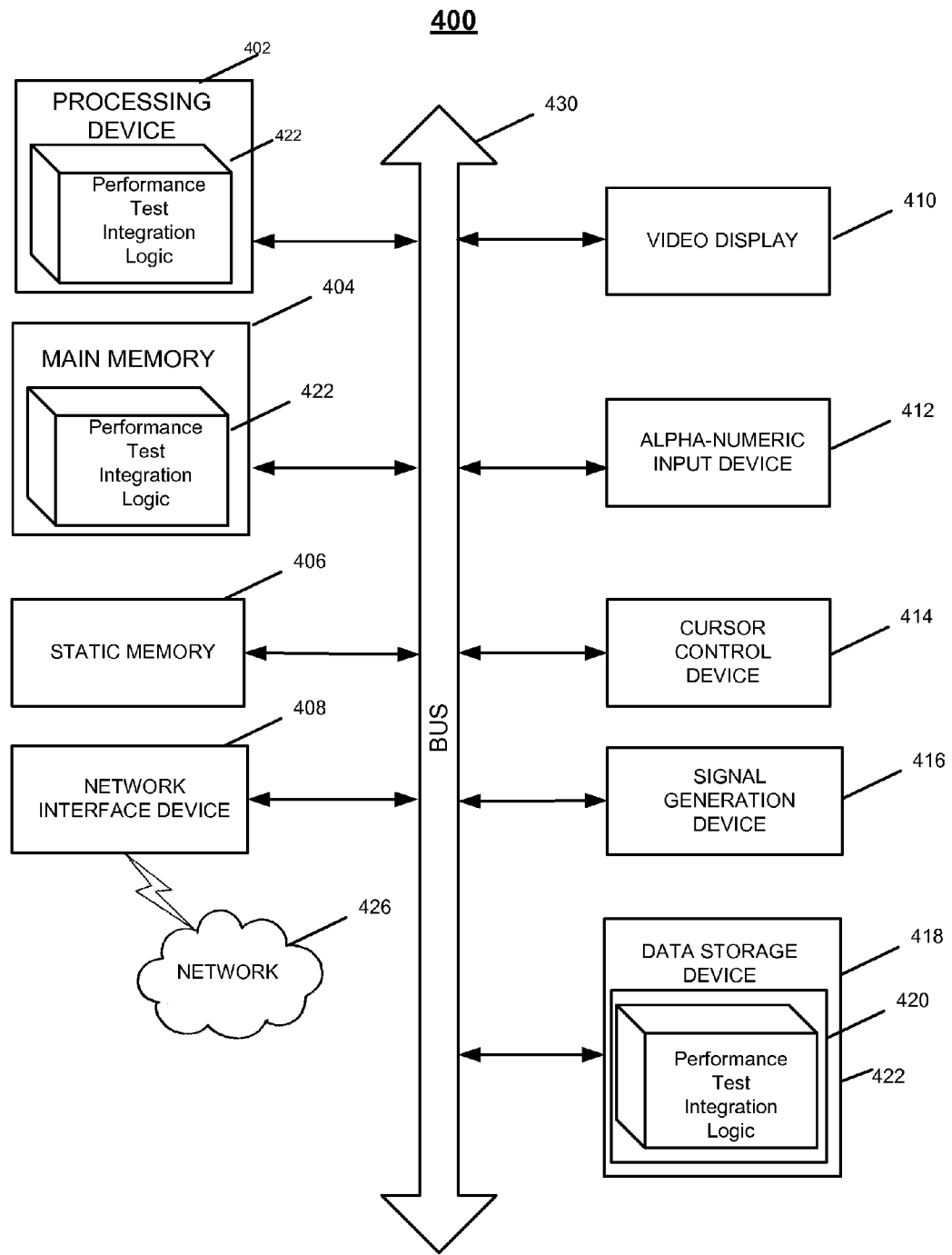
FIG. 4 illustrates a block diagram of one embodiment of a computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a memory 404 (e.g., read-only memory (ROM), flash memory, dynamic random access memory (DRAM) (such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 330.

Processing device 402 represents one or more general-purpose processing devices such as a microprocessor, central processing unit, or the like. More particularly, the processing device may be complex instruction set computing (CISC) microprocessor, reduced instruction set computer (RISC) microprocessor, long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute performance test execution logic 422 for performing the operations and steps discussed herein. In one embodiment, performance test execution module 112 described with respect to FIG. 1 performs the performance test execution logic 422.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium (or more specifically a computer-readable storage medium) 420 on which is stored one or more sets of instructions (e.g. performance test execution module logic 422) embodying any one or more of the methodologies of functions described herein, such as method 200 for providing automated performance test execution to a tested system described with respect to FIG. 2. The performance test execution module logic 422 may also reside, completely or at least partially, within the memory 404 and/or within the processing device 402 during execution thereof by the computer system 400; the memory 404 and the processing device 402 also constituting machine-accessible storage media.

The machine-readable storage medium 420 may also be used to store the performance test execution module logic 422 persistently containing methods that call the above applications. While the machine-accessible storage medium 420 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   generating, by a processing device at periodic intervals, actual values of a performance test of a tested system;
   computing, by the processing device, a current value based on the generated actual values;
   computing, by the processing device, a difference between the current value and another current value associated with a prior time, wherein the another current value associated with the prior time is computed based on the generated actual values of the performance test at the prior time; and
   detecting, by the processing device, a beginning of a warm-up period of the tested system when the computed difference is greater than a threshold.

2. The method of claim 1 further comprising repeating the generating, the computing the current value, and the computing the difference when the computed difference is less than or equal to the threshold.

3. The method of claim 1 wherein the computing the difference comprises determining one of an absolute difference value or a relative difference value between the current value and the another current value associated with the prior time.

4. The method of claim 3 wherein the threshold comprises one of a absolute threshold value or a relative threshold value.

5. The method of claim 4 further comprising comparing the absolute difference value with the absolute threshold value.

6. The method of claim 4 further comprising comparing the relative difference value with the relative threshold value.

7. The method of claim 1 further comprising storing the actual value in an ordered set of the actual values, wherein the ordered set comprise a time and the actual value associated with the time.

8. The method of claim 7 wherein, the current value is an average of the actual values in a window when a size of the window is less than a number of the actual values in the ordered set, wherein the window is a subset of the ordered set of the actual values.

9. The method of claim 7 wherein, the current value is an average of the actual values in the ordered set when a size of a window is one of greater than or equal to a number of the actual values in the ordered set, wherein the window is a subset of the ordered set of the actual values.

10. A system, comprising:
a memory; and
a processing device operatively coupled to the memory to:
generate, at periodic intervals, actual values of a performance test of a tested system;
compute a current value based on the generated actual values;
compute a difference between the current value and another current value associated with a prior time, wherein the another current value associated with the prior time is computed based on the generated actual values of the performance test at the prior time; and
detect a beginning of a warm-up period of the tested system when the computed difference is greater than a threshold.

11. The system of claim 10, wherein the processing device repeats the generate of the actual value, the compute of the current value, and the compute of the difference when the computed difference is less than or equal to the threshold.

12. The system of claim 11 wherein to the compute the difference, the processing device is to determine one of an absolute difference value or a relative difference value between the current value and the another current value associated with the prior time.

13. The system of claim 12 wherein the threshold comprises one of a absolute threshold value and a relative threshold value.

14. The system of claim 13 wherein the processing device compares the absolute difference value with the pre defined absolute threshold value.

15. The system of claim 13 wherein the processing device compares the relative difference value with the relative threshold value.

16. The system of claim 11 wherein the actual values are stored in an ordered set of the actual values, wherein the ordered set comprises a time and the actual value associated with the time.

17. The system of claim 16 wherein, the current value is an average of the actual values in a window when a size of a window is less than a number of the actual values in the ordered set, wherein the window is a subset of the ordered set of the actual values.

18. The system of claim 16 wherein, the current value is an average of the actual values in the ordered set when a size of the window is one of greater than or equal to a number of the actual values in the ordered set, wherein the window is a subset of the ordered set of the actual values.

19. A non-transitory machine-readable storage medium including data that, when accessed by a processing device cause the processing device to:
generate, at periodic intervals, actual values of a performance test of a tested system;
compute a current value based on the generated actual values;
compute a difference between the current value and another current value associated with a prior time, wherein the another current value associated with the prior time is computed based on the generated actual values of the performance test at the prior time; and
detect a beginning of a warm-up period of the tested system when the computed difference is greater than a threshold.

20. The non-transitory machine-readable storage medium of claim 19 having further data therein, which accessed by the processing device cause the processing device to:
repeat the generate, the compute the current values, and the compute the difference when the computed difference is less than or equal to the threshold.

* * * * *